Patented Apr. 9, 1935

1,996,800

UNITED STATES PATENT OFFICE 1,996,800

PREPARATION OF EGG PRODUCTS

Norman C. Fischer, Chicago, Ill., assignor to Armour and Company, Chicago, Ill., a corporation of Illinois No Drawing. Application January 24, 1934, Serial No. 708,053

3 Claims. (Cl. 99—5)

The present invention relates to the treatment of egg whites, and has particular reference to an improvement in the drying of egg products such as egg whites or whole eggs, whereby to obtain an improved product in a desirable manner.

A principal object of the invention is the provision of a method of drying egg products such as egg whites or whole eggs which is simple and economical, and capable of being carried out in plant operation as a standard practice.

An additional object is to provide a process whereby egg whites may be dried immediately.

A further object is the provision of a method for drying egg whites which permits them to be reconstituted without loss of the natural characteristics and in such condition as to render them particularly desirable for cooking and similar uses.

A still further object is to produce an improved dried egg white product free from substantial quantities of added chemicals, neutral in character, and capable of being reconstituted to closely resemble natural egg whites.

These and other objects will be apparent from a consideration of the following illustrative and explanative description.

For many years it has been customary to dry egg products such as egg whites for storage and shipping purposes. Particularly is this true where the egg whites are used commercially, as in the case of bakers and confectioners.

When an attempt is made to dry the whites in their natural condition many difficulties are encountered. The viscous whites give up their moisture quite slowly to form a stringy product which cannot satisfactorily be reconstituted.

Recourse has been made to the property of certain classes of bacteria for rendering the ordinarily viscous whites somewhat liquid. The preliminary treatment of the egg whites with bacteria is generally known as "ripening", and consists in maintaining the whites under a condition favorable for bacterial growth for a period usually around five days, it being customary to augment the natural bacteria content of the whites by the addition of a suitable culture. At the end of the ripening period the bacterial action must be stopped to prevent an amount of putrefaction which would impart to the egg whites an odor and a taste sufficiently indicative of their state to render them unfit for consumption. The egg whites are then dried, and the resultant material contains the products of the bacterial fermentation.

I have discovered that egg whites may be dried without the aid of bacterial action, and that the resultant product may be produced substantially free from added chemicals and in such a condition that it may be reconstituted so as to retain the characteristics of fresh egg whites, such as foam formation, beating qualities and lifting power. Furthermore, by my improved process the time required for drying of egg whites is greatly reduced and the process is susceptible of control so that a set treatment may be employed to produce a standard plant product.

The invention is based on my discovery that a particularly satisfactory process for drying eggs may be had by treating the egg whites with hydrochloric acid and following this treatment with a quick-drying process, as will now be described more particularly.

In accordance with my invention the egg whites are placed in a suitable vat and in the absence of bacterial fermentation are treated directly with a sufficient quantity of hydrochloric acid to liquefy the whites in a relatively short period of time. After liquefaction the whites are subjected to a drying action which will reduce the moisture content of the product to the desired extent and at the same time remove the volatile acid which is retained by the whites while liquid.

As an example of my process, I may place in a vat fifteen thousand pounds of fresh egg whites and bring their temperature to about 80° F. To this vat is added, with constant agitation, about eighty pounds of hydrochloric acid. It is preferred to dilute the acid with water to prevent local coagulation of the whites. In general, it will be found advantageous to employ about four per cent of a one-tenth normal solution of the hydrochloric acid. After addition of the acid the egg whites will be found to have a pH of about 5.2, varying somewhat with the buffering action of the particular batch of eggs treated. The acidulated mass is stirred thoroughly for thirty minutes, and at the end of this period it will be found that the viscosity of the whites has been reduced to substantially that of water, indicating a complete liquefaction which could be obtained by bacteriological fermentation only after several days. The liquefied whites are then dried by a spray-drying process or in pans, in either of which cases the drying process results in reduction of the moisture content of the whites to any desired extent and a removal of the acid by which the liquefaction was obtained. During the drying process the temperature of the whites is maintained sufficiently high to obtain efficient vaporization of moisture and hydrochloric acid and sufficiently low to avoid damage to the whites from coagulation by heat. Ordinarily, the dried whites will be found to have a pH of about 7.0, indicating that substantially all of the acid has been removed in the exhaust from the driers. In case traces of the hydrochloric acid are not removed by the drying process, no harm will be caused by consumption of the dried product.

The resulting product does not have an objectionable odor, and may be reconstituted by the consumer in substantially the same state as fresh whites with respect to such characteristics as foam formation, beating qualities, lifting power and general utility as where fresh whites may be used. In addition, the dried product is substantially free from chemicals added to the whites, or resulting from bacterial fermentation. Apparently, the freedom from chemicals and substantially neutral pH of the dried whites contribute considerably to the excellent quality of the whites when reconstituted.

The physical conditions of the process and amount of hydrochloric acid employed are not necessarily limited as in the specific examples given. The time required for liquefying the egg whites will depend upon such factors as the temperature at which the process is carried out and the amount of acid employed. In any case, it will be found that the process may be controlled so as to establish a standard plant practice whereby uniform results may be obtained at all times and a standard product of unusual purity and desirable characteristics obtained. The amount of time consumed in the process is reduced from several days as under former practice to at most a few hours, thereby reducing the cost of the process as well as the amount of equipment necessary to dry the regular plant output of egg whites. It has been my discovery that the whites liquefied by this direct acid hydrolysis when dried result in a product of particularly good quality from the standpoint of reconstitution.

Also, the absence of flavors and odors indicative of the presence of unfavorable fermentation and chemicals has proved of great advantage in marketing the product.

After drying the liquefied whites are in powder or flake form, the particular form depending upon the nature of the drying process, where the whites are dried in a quiescent state, the dried product tends to be of a flaky nature.

Various changes of the procedure heretofore outlined will occur to one skilled in the art and all such modifications are intended to be included in the appended claims.

I claim:

1. A process for producing desiccated egg whites capable of being reconstituted, which comprises liquefying viscous egg whites by treatment with hydrochloric acid in the absence of substantial bacteriological fermentation until the viscosity of the whites is reduced to substantially that of water, and drying the liquefied whites to reduce their moisture content to the desired extent and to remove the acid therefrom.

2. The process of producing desiccated egg whites capable of being reconstituted, which comprises adding hydrochloric acid to viscous egg whites, agitating the mass until the viscosity of eggs is reduced sufficiently for drying purposes, and thereafter subjecting the whites to a temperature sufficiently high to evaporate the whites to dryness and to substantially remove the hydrochloric acid therefrom.

3. A process for drying viscous egg whites for reconstitutional purposes, which comprises liquefying the viscous egg whites by subjecting them to the action of a sufficiently large quantity of hydrochloric acid to reduce the viscosity of the whites to substantially that of water, removing substantially all of said acid from the liquefied egg whites and reducing the moisture content of the liquefied whites to the desired extent.

NORMAN C. FISCHER.